United States Patent [19]

Reneau

[11] Patent Number: 4,523,742
[45] Date of Patent: Jun. 18, 1985

[54] APPARATUS FOR TENSIONING A STUD AND METHOD OF DOING SAME

[75] Inventor: Bobby J. Reneau, Houston, Tex.

[73] Assignee: Gripper, Inc., Houston, Tex.

[21] Appl. No.: 515,285

[22] Filed: Jul. 19, 1983

Related U.S. Application Data

[63] Continuation-in-part of Ser. No. 342,235, Jan. 25, 1982, Pat. No. 4,438,901.

[51] Int. Cl.$^3$ .............................................. E21B 19/00
[52] U.S. Cl. .................................. 254/29 A; 81/57.38; 29/452
[58] Field of Search ................. 254/29 A, 105; 81/57, 81/38; 29/452; 91/152, 44, 45; 60/593

[56] References Cited

U.S. PATENT DOCUMENTS

3,485,046 12/1969 Gebhardt ............................. 60/593
3,494,592 2/1970 Meschonat et al. ............... 254/29 A
3,821,934 7/1974 Maeda .................................. 254/105
4,106,390 8/1978 Kodaira et al. ......................... 91/44

Primary Examiner—Robert C. Watson
Attorney, Agent, or Firm—Pravel, Gambrell, Hewitt & Kimball

[57] ABSTRACT

The apparatus for tensioning a stud and a method of doing same, with the apparatus including a body adapted to be removably mounted with the stud, the body including a first body member and a second body member movable with respect thereto, with the second body member having a gripper assembly therewith for gripping the stud as desired, and high and low pressure force means with the body for moving the second body member with respect to the first body member from a contracted position wherein the gripper assembly engages the stud and in an expanded position wherein the gripper assembly tensions the stud.

17 Claims, 3 Drawing Figures

APPARATUS FOR TENSIONING A STUD AND METHOD OF DOING SAME

This application is a continuation-in-part application based on prior application Ser. No. 342,235, filed Jan. 25, 1982, now U.S. Pat. No. 4,438,901, entitled "Apparatus For Tensioning A Stud And A Method of Doing Same".

FIELD OF THE INVENTION

The present invention relates generally to the field of tensioning devices, and more particularly to those that are used to tension a stud to thereafter permit the threading of a nut thereon the tensioned stud for retaining stud tension.

DESCRIPTION OF THE PRIOR ART

In the makeup of stud and nut assemblies requiring extremely high tension loads on studs, such as in the makeup of a flange for a nuclear reactor vessel wherein stud tensions may easily exceed 100,000 pounds, it is preferred to tension the stud prior to threading of the nut into an engaging position with the surface of a flange in order to effectuate retainage of such high stud tensions. This is true not only for stud-nut assemblies, but also for bolt-nut and other similar assemblies.

It has been known in the prior art that devices for tensioning studs have fallen generally into two classifications, namely those that are non-hydraulically actuated and those that are hydraulically actuated. So far as known, typical devices that are non-hydraulically actuated are such as those disclosed in U.S. Pat. Nos. 3,285,568 and 3,749,362.

On the other hand, there are a variety of hydraulically actuated stud tensioning devices that are also known in the prior art. Some of these devices require permanent affixation to the stud-nut assembly to be tightened, such as disclosed in U.S. Pat. No. 2,866,370. Other types of devices require a double-nut arrangement in order to operate effectively in combination with the hydraulic power, as shown in U.S. Pat. No. 3,338,552 (and its corresponding French Pat. No. 1.437.774 and Canadian Pat. No. 855,134). Other types of hydraulically actuated bolt and/or stud tensioning devices are shown in U.S. Pat. Nos. 3,815,874; 3,844,533 and 4,249,718 as well as U.S. Pat. No. 3,995,828; 3,494,592; and 4,175,453.

However, as noted above, some of these devices require permanent affixation to each individual stud-bolt/nut assembly are not suited for individual stud tensioning-nut tightening operations which thereafter are removable to adjacent stud-nut assemblies for tightening, but rather must be dedicated to particular stud-bolt-nut assemblies. Furthermore, so far as known, some of the prior art stud tensioning devices are incapable of generating the longitudinal forces sufficient to tension studs/bolts when such forces exceed 150,000 pounds of tension. Further, some devices have no way of insuring that the threads of the stud and/or bolt extending from the surface are protected from damage by the use of such stud tensioning devices, prior to actual tensioning operations.

SUMMARY OF THE INVENTION

The present invention relates to a new and improved apparatus for tensioning a stud extending from a surface and a method of doing same wherein the apparatus includes a body adapted to be removably mounted with the stud, the body including a first and second body member with the second body member being movable with respect to the first, and the second body member having a gripper assembly therein for gripping the stud as desired and further including high and low pressure force means with the body for moving the second body with respect to the first body for a constracted position wherein the gripper assembly engages the stud to an expanded position wherein the gripper assembly tensions the stud.

DESCRIPTION OF THE PREFERRED EMBODIMENT

In the drawings, the letter A designates generally the apparatus for tensioning a stud S extending from a surface F. The apparatus A includes generally a body B, gripper means G, an moving means M. Unless otherwise specified, the components of the apparatus A of the present invention are made of steel or other suitable high strength materials capable of taking the high stresses and strains encounted in utilizing an apparatus A for tensioning such a stud S.

The apparatus A of the present invention is adapted to be used for tensioning a stud S. The stud S may include any type of threaded rod such as a stud 10 having threads 10a, a bolt (not shown) or any other similar type of device with a threaded shaft extending from a surface F. Thus, in the specification set forth hereinbelow, reference to a stud S is broad enough to encompass all types of threaded shafts extending from a surface F. Similarly, the surface F may be any type of surface such as a flange surface 12 or any other type of surface. As is conventionally known, typically a suitable nut N including nut 14 having threaded bore 14a is adapted to be received with the compatibly formed threads 10a of the stud 10 of the stud S. Typically threaded action of the nut 14 on the stud 10 results in the lower surface 14b of the nut engaging the flange surface 12 of the surface F for proper makeup thereof. However, such conventional makeup is unsatisfactory in that a sufficient amount of torque may not be applied to the nut N for proper tensioning of the stud S. Typically tensioning of the stud S is required in order to properly tighten and secure, by way of example, opposing faces of a flange and other similar types of structures that require a makeup between two parts, assemblies or the like. It is in this environment that the apparatus A of the present invention is desired to be used to tension the stud S extending from the surface F prior to the nut N being threaded fully on the stud S into engagement with the surface F.

The apparatus A of the present invention includes a body B adapted to be removably mounted with the stud S extending from the surface F. The body B includes a first body member B-1 and a second body member B-2. The first body member B-1 includes a first housing 16 having a surface engaging end 16a and a chamber end 16b. The surface engaging end 16a includes an engaging surface 16c which is adapted to be positioned in engagement with flange surface 12 of surface F. First housing 16 is further formed having a first nut bore 16d and a second not bore 16e of slightly larger diameter, separated by annular lip 16f, with the nut N adapted to be disposed within the first and second nut bores 16d, 16e, respectively, as discussed more fully hereinbelow. The first nut bore 16d includes a radial surface 16g adjacent to the upper end thereof with second housing bore 16h formed adjacent thereto. Radial surface 16i is formed adjacent to second housing bore 16h, with annular surface 16j extending upwardly from the radial surface 16i. Threads 16k are located at the upper end of radial surface 16i and engage the threads 16l of end cap 16m. End cap 16m has an outer annular surface 16n which is in alignment with the chamber end 16b of the first housing 16 of the first body member B-1. End cap 16m has an upper radial surface 16o, an inner annular surface 16p which is in sliding contact with radial surface 18r of the second body member B-2, and a lower radial surface 16q. Regulation passage 16r extends from portion of chamber end 16b to radial surface 16i. Threads 16s are located at the end of regulation passage 16r which radially protrudes through chamber end 16b. Regulation passage 16r is used in applying high pressure force means P to the apparatus A of the present invention as more fully described below. Regulation passage 16t extends from chamber end 16b to second housing bore 16h wherein said regulation passage 16t communicates with regulation passage 18t in second body member B-2. Regulation passage 16t is also in flow communication with retraction ring 18x to be more fully described hereinbelow. Regulation passage 16t contains threads 16u at the point where passage 16t projects through chamber end 16b. Regulation passage 16t is also used for application of low pressure force means Z to the apparatus A of the present invention as more fully discussed hereinbelow. The second housing bore 16h, radial surface 16i and annular surface 16j form a portion of the chamber end 16b of first housing 16 of the first body member B-1 which is adapted to receive the second body member B-2.

The apparatus A of the present invention further includes second body member B-2 which includes second housing 18. The second housing 18 is formed having stud bore 18a therethrough which is adapted to receive the stud S therein. An end surface 18b is preferably formed at the lower end of the stud bore 18a with annular surface 18c formed adjacent thereto and being substantially concentric with stud bore 18a. Retraction ring 18x is retained at the lower end of second body member B-2 to annular surface 18c by way of ring 18y which is mounted in circumferential groove 18z of the second body member B-2. Outer annular surface 18aa of retraction ring 18x is disposed to reciprocate vertically within first nut bore 16d. As assembled, low pressure force means Z when applied through regulation passage 16t act to impart a downward force on second body member B-2 by exerting downward forces on upper surface 18bb of retraction ring 18x. Sealing means 60 ensures a fluid-tight relation between first nut bore 16d and outer annular surface 18aa. Sealing means 62 ensures a fluid-tight relation between annular surface 18c and inner annular surface 18cc. Lower radial surface 18dd bears on ring 18y and tapered surface 18ee extends outwardly from lower radial surface 18dd to outer annular surface 18aa. A radial surface 18d is preferably formed adjacent the upper end of the annular surface 18c. Outer annular surface 18f is formed adjacent to radial surface 18d such that it may be compatibly disposed within annular surface 16j of the first housing 16 of the first body member B-1, as is annular surface 18c fitted compatibly within second housing bore 16h of first housing 16. Furthermore, second housing 18 also contains a radial surface 18ff adjacent to outer annular surface 18f and annular surface 18r adapted to be received by inner annular surface 16p of end cap 16m on first body member B-1. As can readily be seen, lower radial surface 16q of end cap 16m on first body member B-1 effectively stops upward movement of second body member B-2 relative to first body member B-1 when radial surface 18ff is in contact with lower radial surface 16q.

As such, the second housing 18 is adapted to move with respect to the first housing 16 with suitable seal means 20 and 22 disposed between the respective moving surfaces to ensure a fluid-tight relation therebetween. The second housing 18 further includes a camming surface 18g formed adjacent the upper end of the stud bore 18a with lower camming sleeve bore 18h formed adjacent thereto. The second housing 18 further contains upper camming sleeve bore 18w. Regulation passage 18t, to be fully discussed below, adjoins radial surface 18u projecting radially into upper camming sleeve bore 18w. Threads 18i are formed adjacent the upper end of the upper camming sleeve bore 18w and are adapted to receive compatibly formed threads 18j formed with end cap 18k. The end cap 18k further includes radial surface 18l and an adjacent annular surface 18m having an end surface 18n formed adjacent the lower end of the annular surface 18m. Preferably, a bore 18o is formed in the end cap 18k of such a diameter that the stud S may extend therethrough as desired. Tapered surface 18hh is found at the top of bore 18o adjacent to end surface 18p. It is preferred that when the end cap 18k is properly threaded with the second housing 18, that the upper end surface 18p of the end cap 18k is substantially aligned with the upper end surface 18q of the second body member B-2, with suitable seal means 26 disposed to ensure a fluid-tight relationship therebetween. The second housing 18 further includes an outer annular surface 18r disposed between the upper end surface 18q and radial surface 18ff.

The second body member B-2 of the apparatus A further includes a regulation passageway 18ii extending from annular surface 18w laterally and longitudinally to radial surface 18d. Second body member B-2 of the apparatus A further includes regulation passgeway 18t extending from lower camming sleeve bore 18h and extending laterally, longitudinally, and obliquely through second body member B-2 until it finally communicates with annular surface 18c.

The apparatus A of the present invention further includes gripper means or gripper assembly G which is adapted to be mounted surrounding the stud bore 18a of the second housing 18 of the second body member B-2 for gripping the stud S as desired. The gripper means G includes generally collet means C and camming means D. The collet means C is adapted to engage the stud S, with the collet means C being movable between a retracted position wherein the collet means C is not in engagement with the stud S (FIG. 1) and an engaging position wehrein the collet means C is in engagement with the stud S (FIG. 2). The collet means C includes a collet 28 which is preferably segmented into multiple sections as is illustrated in FIG. 3 and may include collet segments 28a, 28b, 28c, 28d. Preferably, the collet 28 is formed having a lower camming surface 28e with each of the collet segments and an upper camming surface 28f with the upper end of each of the collet segments of the collet 28. Preferably, the lower camming surface 28e is adapted to engage the camming surface 18g of the second housing 18 of the second body member B-2 while the upper camming surface 28f is adapted to engage a camming sleeve 30 of the gripper means C.

The camming sleeve 30 is formed having a camming surface 30a which is adapted to engage the upper camming surface 28f of the collet 28, and an outer annular surface 30b which is adapted to be compatibly disposed adjacent to the lower camming sleeve bore 18h of the second housing 18 as well as the upper camming sleeve bore 18w of the second housing 18. The camming sleeve 30 further includes radial surface 30c adjacent to annular surface 30b, annular surface 30d adapted to be compatibly disposed in upper camming sleeve bore 18w, and end surface 30g at the upper end of the camming sleeve 30. An inner annular surface 30h is formed between the end surface 30g and radial surface 30i, which is formed adjacent to bore 30j. The bore 30j is preferably formed between the radial surface 30i and camming surface 30a and is the same diameter as stud bore 18a. It will be appreciated that as such, the camming sleeve 30 is adapted to be compatibly received within the lower camming sleeve bore 18h and within camming sleeve bore 18w and annular surface 18m for longitudinal movement with respect to the second body member B-2 of the present invention. Suitable seal means 32 ensures a fluid-tight relation between the outer annular surface 30d of camming sleeve 30 and upper camming sleeve bore 18w of second housing 18. Seal means 33 ensures a fluid-tight relation between lower camming sleeve bore 18h and outer annular surface 30b of camming sleeve 30. Seal means 34 ensures a fluid-tight relation between inner annular surface 30h of the camming sleeve 30 and the annular surface 18m of the second housing 18 of the second body member B-2.

The camming sleeve 30 is mounted for longitudinal movement with the bores 18h and 18w of the second body member B-2. Further, the camming sleeve 30 in cooperation with the camming surface 18g of the second housing 18 form the camming means designated generally as D of the present invention. It should be noted that camming surface 18g is at the same angle as the angle of the threads 10a, in order that the apparatus of the present invention be effectively used. In addition, as shown in FIG. 3, the collet 28 is included with the collet means C of the present invention, which is adapted to engage the stud S. The collet means C is movable between a retracted position (FIG. 1) wherein the collet means C is disposed between the camming sleeve 30 and the camming surface 18g of the second housing 18 of the second body member B-2 of the camming means D. The collet means C in addition to the collet 28 includes spring means designated generally as E. The spring means E includes suitable springs 36 adapted to be disposed within cavities 28g formed within the collet segments of the collet 28 for urging the segmented collet 28 radially outwardly into a movably retracted position in the presence of the low pressure force means Z as described more fully hereinbelow.

Figure 1:
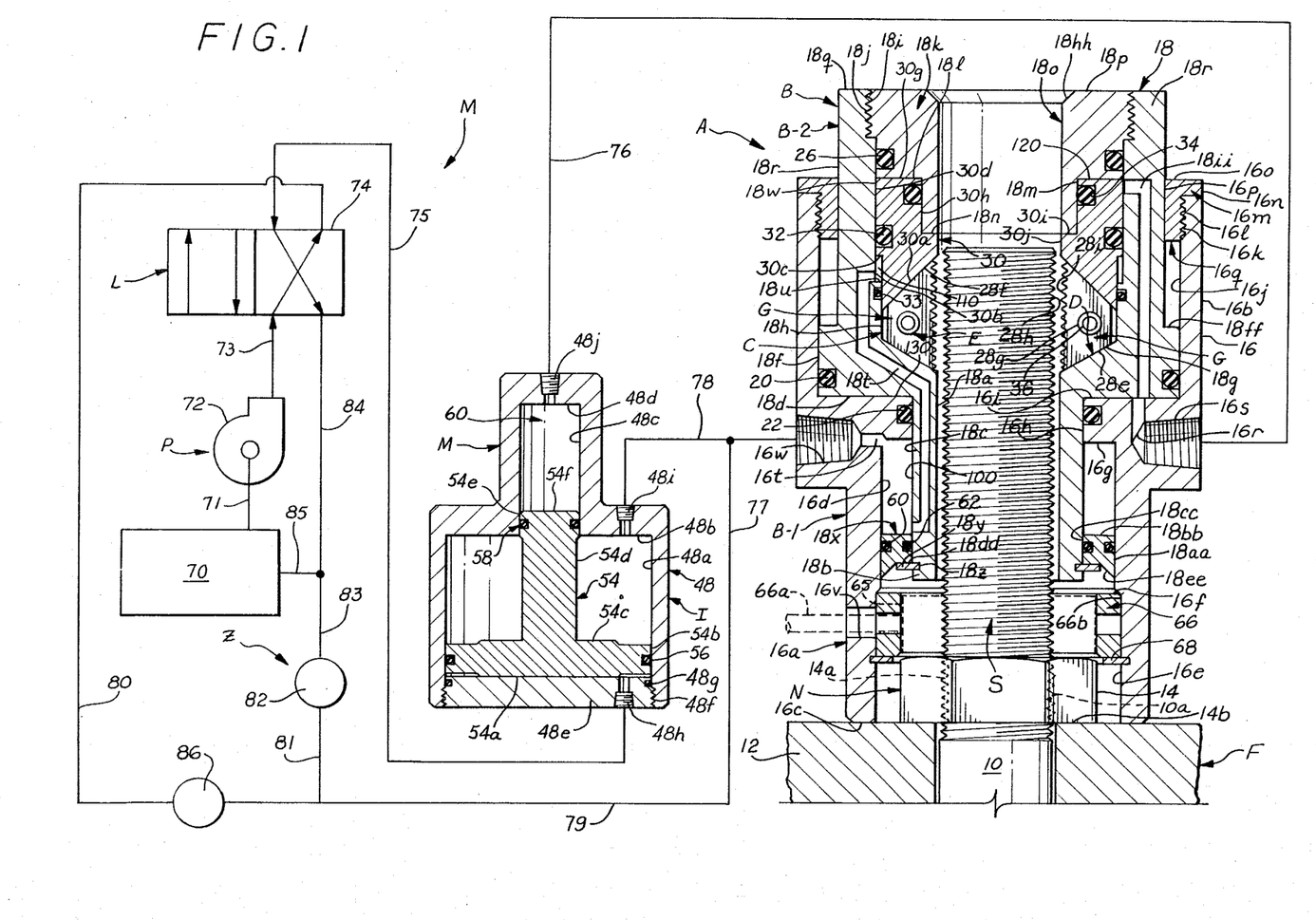
FIG. 1 is a sectional, elevational, partially schematic view of the apparatus for tensioning the stud of the present invention, showing the collet means in a retracted position and the second body member in a contracted position with respect to the first body member.
Figures 2, 3:
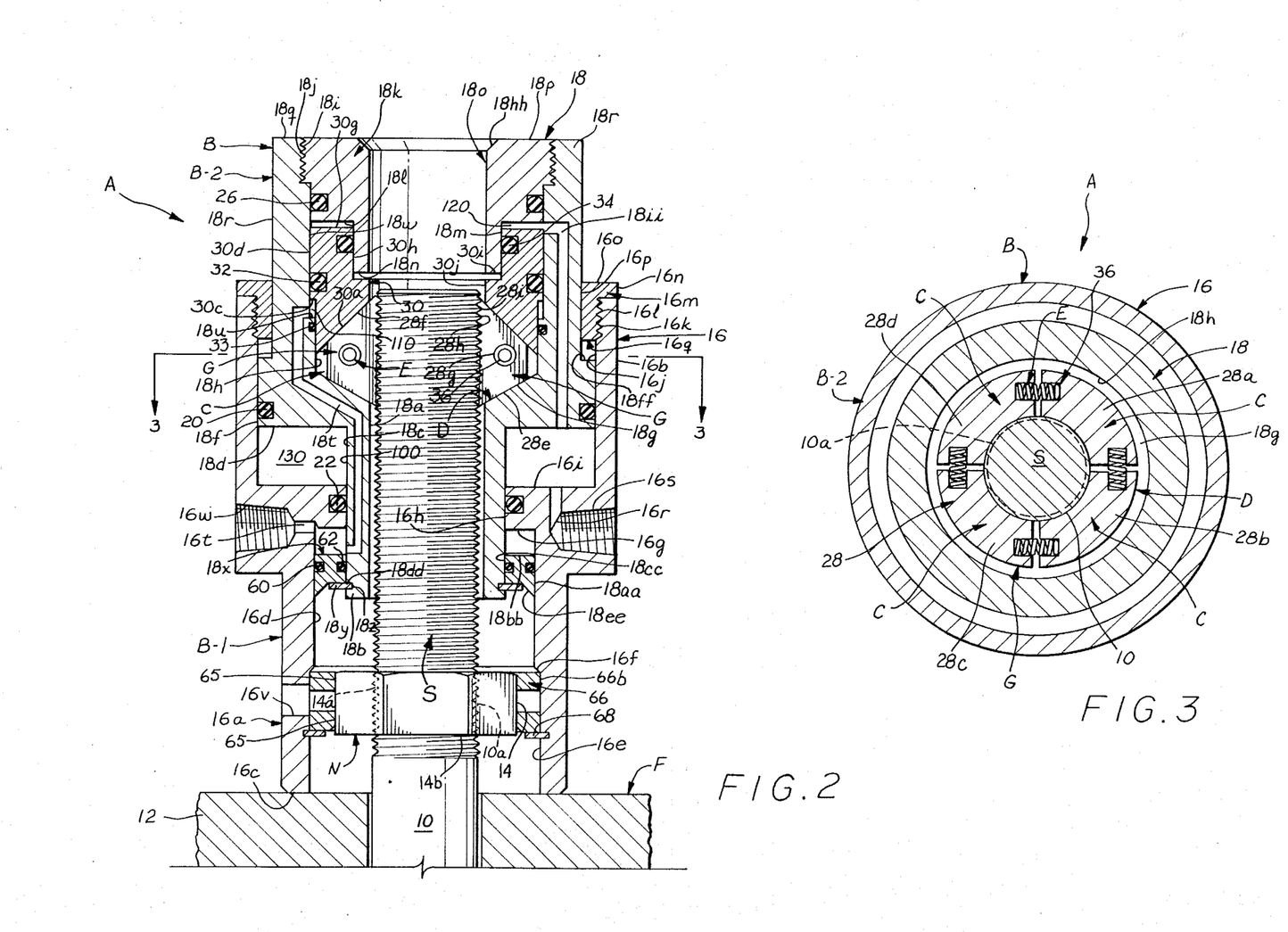
FIG. 2 is a sectional, elevational view similar to that of FIG. 1, showing the apparatus for tensioning stud of the present invention wherein the collet means is in an engaging position and the second body member is in an expanded position with respect to the first body member, for tensioning the stud.
FIG. 3 is a sectional, plan view of the apparatus for tensioning the stud of the present invention, taken along the lines 3—3 of FIG. 2, illustrating the collet means of the present invention.

The apparatus A of the present invention further includes moving means M for moving the second body member B-2 with respect to the first body member B-1 from the contracted position of FIG. 1 wherein the gripper means G may engage the stud S and an expanded position (FIG. 2) wherein the gripper means C applies tension to the stud S. The moving means M includes high pressure force means P with the body B and in flow communication with the gripper means G and the first body member B-1 as well as low pressure force means Z with the body B and in flow communication with gripper means G and first body member B-1. The high pressure force means P forces the gripper means G into engagement with the stud S while also forcing movement of the second body member B-2 from the contracted position to the expanded position. The high pressure force means P includes amplifier means I for amplifying the pressure force means P as desired. More specifically, the pressure force means P preferably includes a suitable pressurized hydraulic fluid received from a fluid pressure reservoir designated as 70 connected to any suitable high pressure fluid pump 72 capable of directing pressurized hydraulic fluid therefrom, or any other suitable high pressure fluid source by conduit 71. The discharge of the fluid pressure source 72 is directed into a two position four-way valve 74 also known as release means L via conduit 73. Four-way valve 74 is manually operated and is of a type well known in the hydraulic art. Hydraulic fluid under pressure from pump 72 is directed by valve 74 either to opening 48h of amplifier means I or back to reservoir 70.

The amplifier means I includes an amplifier housing 48 formed having a first bore 48a, a radial surface 48b, a second bore 48c that is preferably of a diameter less than that of the first bore 48a, and an end surface 48d. Preferably an end cap 48e is threadedly received in first bore 48a by means of threads 48f, which is sealed by seal means 48g disposed therebetween. Preferably, a suitable opening 48h is formed in the end cap 48e and is adapted to be in flow communication with flowline 75 for receiving pressurized fluid from the fluid pressure source 72. Furthermore, an opening 48i is formed adjacent the radial surface 48b for receiving fluid flowing in flowline 78 as described more fully hereinbelow. An opening 48j is formed adjacent to end surface 48d for communicating with flowline 76 which extends between opening 48j of the amplifier housing 48 and is threaded to threads 16s of regulation passageway 16r. A piston 54 is adapted to be disposed within the amplifier housing 48. The piston 54 includes end surface 54a, annular surface 54b, end surface 54c, rod 54d, and annular surface 54e adjacent the upper end thereof. Preferably, the annular surface 54b is adapted to be disposed adjacent to first bore 48a of the amplifier housing 48 in a sealable relation by means of seal means 56 and is adapted to move longitudinally therein. In similar fashion, annular surface 54e is adapted to be compatibly disposed within the second bore 48c of amplifier housing 48 in a sealable relation by means of seal means 58, permitting sealable, longitudinal movement thereof within the second bore 48c. Hydraulic fluid pressure entering the amplifier means I through flowline 75 acts upon end surface 54a of piston 54, to move the piston 54 upwardly as viewed in FIG. 1. Inasmuch as the fluid pressure acts upon the surface area of end surface 54a of the piston 54 which is greater than that of end surface 54f, a resultant amplification of the fluid pressure results. The magnitude of amplification is related to a ratio of the radii of the end surface 54a to that of end surface 54f. It will be appreciated that fluid exists in the chamber 60 which is defined by the end surface 54f of the piston 54, second bore 48c and end surface 48d of amplifier housing 48. As hydraulic fluid pressure is exerted from the fluid pressure source 72 through flowline 73, valve 74 and flowline 75 acting upon end surface 54a, a multiplication or amplification effect occurs within the chamber 60 thus resulting in a flow of high pressure fluid outwardly from the chamber 60 into flowline 76 of a magnitude greater than that entering the amplifier housing 48 from flowline 75.

Therefore, high pressure forces means P are applied to the apparatus A when valve 74 permits high pressure fluid from pump 72 to enter amplifier means I which results in a magnified pressure applied to regulation passageway 16r of the first body member B-1 of the apparatus A.

The apparatus A of the present invention also includes low pressure force means Z as part of moving means M for two purposes. Low pressure force means Z initially maintains the gripper means G in a contracted position as well as maintaining the second body member B-2 in a fully contracted position with respect to the first body member B-1. If the position of valve 74 is changed to redirect high pressure force means from regulation passageway 16r to reservoir 70 via flowlines 84 and 85, low pressure force means Z initially moves second body member B-2 towards a contracted position with respect to first body member B-1. Such contraction acts to remove tension on a stud whereupon pressure force means Z acts to retract gripper means G from engagement with the stud S. Low pressure force means Z are applied to regulation passage 16t of first body member B-1 when valve 74 is placed in a position where flowline 73 is aligned with flowline 80. Fluid may then flow in flowline 80 past check valve 86 through flowlines 79 and 77 and into regulation passage 16t. Flowline 77 is threaded into threads 16u at the end of regulation passage 16t. Fluid pressure on regulation passage 16t is maintained at a preset level by back pressure regulator 82 located in flowline 81. Excess pressure in flowline 81 above the preset value of regulator 82 is relieved when regulator 82 permits flow through flowline 83 and 85 back to reservoir 70. Similarly, when valve 74 is used to align flowline 73 with flowline 75 thereby applying high pressure force means P to the apparatus A, low pressure force means Z continues to be applied to regulation passage 16t because check valve 86 effectively blocks flow in conduit 80 back to reservoir 70 via valve 74 and flowlines 84 and 85. At the same time, regulator 82 maintains a preset back pressure in conduit 81 thereby ensuring continued application of low pressure force means Z to regulation passage 16t. It is clear that when the position of valve 74 is changed to align flowline 73 with flowline 80 instead of flowline 75 that valve 74 simultaneously aligns flowline 75 with flowline 84. As a result of such movement of valve 74 opening 48h of amplifier means is aligned to reservoir 70 via flowline 75, valve 74, flowline 84, and flowline 85. As a result, piston 54 in amplifier means I is urged to move towards end cap 48e. To facilitate such movement of piston 54, low pressure force means Z relieves the vacuum thus created behind piston 54 by admitting fluid into opening 48i via flowline 78 connected to flowlines 79 and 77.

In using the apparatus A for tensioning a stud as extending from a surface F, low pressure force means Z is applied to regulation passage 16t prior to placing the apparatus A over a stud S. Low pressure force means Z enters regulation passage 16t and immediately fills expansable chamber 100 which is defined by surface 18bb, surface 16d, surface 18c and surface 16g. Fluid also flows into regulation passageway 18t and enters camming sleeve retraction chamber 110. Camming sleeve retraction chamber 110 is formed by surfaces 18u on the bottom, 30c on the top and annular surfaces 30b on the inside and 18w on the outside. In the absence of high pressure force means P, low pressure force means Z exerts upward fluid pressure on gripper means retraction surface 30c of camming sleeve 30 due to pressure exerted in camming sleeve retraction chamber 110. As a result of such pressures, camming sleeve 30 is pushed upward until end surface 30g comes in contact with radial surface 18l. Simultaneously, low pressure means Z acting in expansible chamber 100, exerts a force on second body retraction surface 18bb thereby urging second body member B-2 into its fully retracted position with respect to first body member B-1 which occurs when radial surface 18d is in contact with radial surface 16i. Therefore, with camming sleeve 30 fully retracted allowing segmented collets 28a, 28b, 28c, 28d to retract fully from stud bore 18a, and second body member B-2 fully retracted with respect to first body member B-1, the apparatus is ready to be placed over a stud S.

After the apparatus A is placed over stud S extending from a flat surface F, valve 74, as previously described, is operated to align conduit 73 with conduit 75 thereby activating high pressure force means P. High pressure force means P are applied to first body member B-1 through regulation passage 16r. Fluid immediately flows through regulated passage 16r to passage 18ii within second body member B-2 to camming sleeve actuation chamber 120. Camming sleeve actuation chamber 120 is formed by gripper means actuation surface 30g at the bottom, surfaces 18l at the top and 18m and 18w on the sides. High pressure force means P also expands into stud tensioning chamber 130. Stud tensioning chamber 130 is formed by second body extension surface 18d at the top, and surfaces 16i at the bottom, 16h on the inside and 16j on the outside. As can readily be seen, when high pressure force means P are applied to camming sleeve actuation chamber 120 and stud tensioning chamber 130 the initial result is that downward forces applied to camming sleeve 30 from camming sleeve actuation chamber 120, overcome upward forces of low pressure force means Z exerted in camming sleeve retraction chamber 110. Therefore, camming sleeve 30 is urged downwardly thereby forcing collet segments 28a, 28b, 28c and 28d into contact with the stud S. After camming sleeve 30 has brought segmented collets 28a, 28b, 28c and 28d into contact with the stud S, high pressure force means P operating in stud tensioning chamber 130, overcome low pressure force means Z acting in expansable chamber 100 with the result that second body member B-2 is elevated from a contracted position where the segmented collets 28 grip the stud S to an expanded position where the segmented collets 28 exert tensile forces on the stud S. As should be apparent to one skilled in the hydraulic art, the reason that camming sleeve 30 urges segmented collets 28 into contact with stud S before second body member B-2 begins to move with respect to first body member B-1 is that as high pressure force means P are applied to first body member B-1, the difference in bearing area presented by gripper means actuation surface 30g and gripper means retraction surface 30c is greater than the difference between second body extension surface 18d and second body retraction surface 18bb. Therefore, it can be seen that collet 28 will initially move radially inwardly to a point where the collet threads 28h formed within inner bore 28i of the collet 28 engage the threads 10a of the stud 10. As such, the collet means C is movable between the retracted position of FIG. 1 to an engaging position of FIG. 2 where the collet means C is in full engagement with the threads 10a of the stud 10. Thereafter, high pressure force means P acts to move second body member B-2 relative to first body member B-1 which results in a tensile force applied by collets 28 to threads 10a of stud 10. Further, it should be noted that it is preferred that the apparatus A be initially positioned with surface 16c not in engagement with flange surface 12 of surface F to permit the collet means C to properly engage the threads 10a of stud S. After the collet means engages the threads 10a, the camming action of the camming means D acts to move the surface 16c into engagement with surface F.

Inasmuch as the gripper means G is in engagement with the stud S, the movement of second body member B-2 from the contracted position to the expanded position results in tensioning of the stud S. The camming means D of the gripper means G is enhanced by the movement of the second body member B-2 with respect to the first body member B-1 from the contracted to the expanded positions. Thus, the greater the tensioning on the stud S by utilization of the apparatus A of the present invention, the greater the gripping of the gripper means G of the present invention. The movement of the body B from the contracted to the expanded position tensions the stud which in effect stretches and/or elongates the stud S.

As is shown in FIG. 1, the nut N is in a relaxed, non-tight position. In FIG. 2, this same relaxed nut position is illustrated by dotted lines 65. Inasmuch as the lower surface 14b of the nut 14 no longer engages the flange surface 12, it is necessary to thread the nut N downwardly along the threads 10a of the stud 10. This is accomplished by rotation of a socket 66 having a removable handle 66a affixed thereto. The handle 66a is adapted to extend from the socket body 66b outwardly through a suitably formed opening 16v formed in the first housing 16 of the first body member B-1. The socket 66 is adapted to engage the nut N for rotating such upon rotative movement of the handle 66a within the opening 16v. The socket 66 is properly located within the second nut bore 16e of the first housing 16 by suitable retaining ring 68 which is mounted with the second nut bore 16e. Thus, by rotation of the socket 66, the nut N is threaded downwardly along the stud S until the lower surface 14b of the nut 14 engages the flange surface 12 in a tight contacting relation while using apparatus A of the present invention for tensioning the stud S. As such, the nut N on the stud S may be drawn much tighter by using the apparatus A of the present invention for tensioning the stud S prior to threaded nut operations than may be expected by conventional nut rotation techniques.

Upon final securing of the nut N in engagement with the surface F, it is desirable that the apparatus A of the present invention be removed. In order to release the apparatus A of the present invention, it is necessary to activate release means L which in turn removes high pressure force means P from regulation passage 16r on first body member B-1 of the apparatus A. Release means L acts to disengage the apparatus A from the stud S by operation of valve 74. As previously described, valve 74 is operated to align flowline 73 with flowline 80 and flowline 75 with flowline 84. As a result, pressure acting on port 48h of amplifier means I is released to reservoir 70. Piston 54 in amplifier means I consequently moves toward end plate 48e allowing low pressure force means Z to force fluid into amplifier means I between piston 54 and surface 48b via opening 48i. Movement of piston 54 towards end plate 48e in amplifier means I results in an effective withdrawal of high pressure force means P from acting on regulation passageway 16r in first body member B-1 of the apparatus A. The withdrawal of high pressure force means P in the presence of low pressure force means Z allows second body member B-2 to start movement between the expanded position wherein segmented collets 28 apply tensile forces to the stud to the contracted position thereby relieving tension on the stud S. After initial movement of second body member B-2 from the expanded position to the contracted position, camming sleeve 30 is pushed upward by the effect of low pressure force means Z and camming sleeve retraction chamber 110. Upward motion of camming sleeve 30 removes pressure on segmented collets 28 thereby allowing them to move from the engaging position of FIG. 2 to their retracted position of FIG. 1 due to the biasing of spring means E acting on segmented collets 28. As can be seen, when withdrawing the apparatus from a stud S by removing high pressure force means P while at the same time maintaining low pressure force means Z, the second body member B-2 will move from the expanded position to the contracted position before camming sleeve 30 begins to retract thereby preventing potential damage to the apparatus or the threads of stud S by prematurely disengaging segmented collets 28 from stud S while stud S is subjected to tensile forces. As previously indicated, upon withdrawal of high pressure force means P in the presence of low pressure force means Z, second body member B-2 will begin movement towards its contracted position with respect to first body member B-1 before camming sleeve 30 moves upwardly thereby allowing segmented collets 28 to retract because the difference between bearing areas of second body extension surface 18d and of second body retraction surface 18bb is less than the difference between bearing areas of gripper means actuation surface 30g and of gripper means retraction surface 30c.

Thus the apparatus A and method for tensioning a stud S of the present invention provides a new and improved apparatus and method for tensioning individual studs S for thereafter tightening of the nut N threaded on the stud S, with the apparatus A adapted to be moved quickly and efficiently between studs S as desired. The apparatus A provides ease of operator manipulation and also protects the threads 10a of the stud S from damage. The apparatus A of the present invention also permits quick, high tension forces that may easily exceed 150,000 pounds of tension in typical nut tightening operations.

The foregoing disclosure and description of the invention are illustrative and explanatory thereof, and various changes in the size, shape and materials as well as in the details of the illustrated construction may be made without departing from the spirit of the invention.

What is claimed is:

1. An apparatus for tensioning a stud extending from a surface, comprising:
    a body adapted to be removably mounted about the stud extending from the surface, said body including a first body member and a second body member;
    said first body member having a surface engaging end and a chamber end, said surface engaging end for engaging the surface and said chamber end for receiving said second body member;
    said second body member having a stud bore therethrough adapted to receive the stud therein:
    gripper means surrounding said stud bore of said second body member for gripping the stud;
    low pressure force means acting within said body on said gripper means for retaining said second body member in a contracted position where said second body member is contracted into said first body member when said apparatus is mounted on a stud and for moving said gripper means to a retracted position from said stud bore thereby facilitating mounting of said tensioner on said stud;
    high pressure force means acting within said body on said gripper means for overpowering the effects of said low pressure force means and moving said gripper means and said second body member, said high pressure force means moving said gripper means from said retracted position to an engaging position in engagement with the stud, and as a result of the pressure buildup when said gripper means is in the engaging position said high pressure force means moving said second body member from a contracted position, wherein said gripper means is in said engaging position to an expanded position wherein said gripper means tensions the stud; and,
    regulation means operably connected to said high and low pressure force means for automatically regulating radial movement of said gripper means into engagement with the stud prior to said second body member moving from said contracted position to said expanded position.

2. The apparatus of claim 1, further including:
    amplifier means operably connected to said high pressure force means for applying an amplified high pressure force to said body.

3. An apparatus for tensioning a stud extending from a surface, comprising:
    a body adapted to be removably mounted about the stud extending from the surface, said body including a first body member and a second body member;
    said first body member having a surface engaging end and a chamber end, said surface engaging end for engaging the surface and said chamber end for receiving said second body member;
    said second body member having a stud bore therethrough adapted to receive the stud therein:
    gripper means surrounding said stud bore of said second body member for gripping the stud;
    low pressure force means acting within said body for retaining said second body member in a contracted position where said second body member is contracted into said first body member when said apparatus is mounted on a stud and for moving said gripper means to a retracted position from said stud bore thereby facilitating mounting of said tensioner on said stud;
    high pressure force means acting within said body for overpowering the effects of said low pressure force means and moving said gripper means and said second body member, said high pressure force means moving said gripper means from said retracted position to an engaging position in engagement with the stud, and said high pressure force means moving said second body member from a contracted position, wherein said gripper means is in said engaging position to an expanded position wherein said gripper means tensions the stud;
    regulation means operably connected to said high and low pressure force means for automatically regulating radial movement of said gripper means into engagement with the stud prior to said second body member moving from said contracted position to said expanded position;
    said regulation means further comprising:
    a gripper means retraction surface on said gripper means, said low pressure force means engaging said gripper means retraction surface to retract said gripper means from said stud;
    a second body retraction surface on said second body, said low pressure force means engaging said second body retraction surface to move said second body toward said contracted position;
    a gripper means actuation surface on said gripper means, said high pressure force means engaging said gripper means actuation surface to urge said gripper means to grip said stud;
    a second body extension surface on said second body, said high pressure force means engaging said second body extension surface to move said second body from said contracted position to said expanded position; and
    whereupon application of said high pressure force means to said body in the presence of said low pressure force means in said body will force said gripper means to engage the stud before said second body member begins movement from said controlled position to said expanded position due to the difference in area between the said gripper means actuation surface and said gripper means retraction surface being larger than the difference in area between said second body extension surface and said second body retraction surface.

4. The apparatus of claim 3, wherein said gripper means includes:
    segmented collets circumferentially mounted around said bore of said second body member for engaging the stud, said segmented collets being movable between said retracted position wherein said segmented collets are not in engagement with the stud and said engaging position wherein said segmented collets are in engagement with the stud;
    camming means surrounding said stud bore for camming said segmented collets for movement between said retracted position and said engaging position; and
    spring means between said segmented collets for urging said segmented collets into a movably retracted position in the presence of said low pressure force means, and the absence of high pressure force means.

5. The apparatus of claim 4, wherein said camming means includes:
   a camming sleeve mounted for longitudinal movement surrounding said stud bore of said second body member; and
   a camming surface on said second body member.

6. The apparatus of claim 5, wherein said segmented collets are disposed between said camming sleeve and said camming surface.

7. The device of claim 6, wherein said gripper means retraction surface is located on said camming sleeve; and
   said gripper means actuation surface is located on said camming sleeve.

8. The apparatus of claim 3, wherein said regulation means includes:
   release means operably connected to said high and low pressure force means for automatically actuating initial releasable movement of said second body member from said expanded position to said contracted position prior to disengagement of the stud by said gripper means by way of relieving said high pressure force means from acting within said body thereby allowing said low pressure force means to act on said body;
   whereupon withdrawal of high pressure force means from said body in the presence of said low pressure force means in said body will force said second body member to automatically move from said expanded position to a said contracted position before movement of said camming sleeve allows said segmented collets to disengage said stud due to the difference in area between said second body extension surface and said second body retraction surface being smaller than the difference in area between said gripper means actuation surface and said gripper means retraction surface.

9. A method for tensioning a stud extending from a surface, comprising the steps of:
   forcing fluid under low pressure into a low pressure regulation passage of a first body member of a body thereby holding a second body member of said body retracted within a chamber of the first body member said low pressure fluid force acting on a gripper assembly;
   positioning a body including a first body member and a second body member, the first body member having a surface engaging end and a chamber end, the second body member formed having a stud bore therethrough and received with the chamber of the first body member, the surface engaging end of the first body member adapted to engage the surface as a result of said positioning, about the stud extending from the surface;
   forcing fluid under high pressure into a high pressure regulation passage in the first body member for actuating the gripper assembly by first overcoming retraction forces caused by said low fluid pressure forcing;
   gripping the stud with the gripper assembly within the stud bore of the second body member;
   automatically regulating distribution of said high and low forcing fluid pressure such that the gripper assembly is forced to securely engage the stud before the second body member can be forced from the contracted position wherein the gripper assembly engages the stud to the expanded position wherein the gripper assembly tensions the stud; and
   moving the second body member automatically from the contracted position after the gripper assembly engages the stud, due to the pressure buildup in said high pressure regulation passage, to an expanded position wherein the gripper assembly tensions the stud.

10. The method of claim 9, further including the step of:
    amplifying low fluid pressure to achieve a high fluid pressure for actuating the said gripper assembly for forcing said second body member from said contracted position to the said expanded position.

11. An apparatus for tensioning a stud extending from a surface, comprising:
    a body adapted to be removably mounted about the stud extending from the surface, said body including a first body member and a second body member;
    said first body member having a surface engaging end and a chamber end, said surface engaging end for engaging the surface and said chamber end for receiving said second body member;
    said second body member having a stud bore therethrough adapted to receive the stud therein:
    gripper means surrounding said stub bore of said second body member for gripping the stud;
    low pressure force means acting within said body for retaining said second body member in a contracted position where said second body member is contracted into said first body member when said apparatus is mounted on a stud and for moving said gripper means to a retracted position from said stud bore thereby facilitating mounting of said tensioner on said stud;
    high pressure force means acting within said body for overpowering the effects of said low pressure force means and moving said gripper means and said second body member, said high pressure force means moving said gripper means from said retracted position to an engaging position in engagement with the stud, and said high pressure force means moving said second body member from a contracted position, wherein said gripper means is in said engaging position to an expanded position wherein said gripper means tensions the stud;
    regulation means operably connected to said high and low pressure force means for automatically regulating radial movement of said gripper means into engagement with the stud prior to said second body member moving from said contracted position to said expanded position;
    amplifier means operably connected to said high pressure force means for applying an amplified high pressure force to said body;
    release means operably connected to said high and low pressure force means for automatically actuating initial releasable movement of said second body member from said expanded position to said contracted position prior to disengagement of the stud by said gripper means by way of relieving said high pressure force means from acting within said body thereby allowing said low pressure force means to act on said body; and
    whereupon withdrawal of high pressure force means from said body in the presence of said low pressure force means in said body will force said second body member to automatically move from said expanded position to a said contracted position before movement of said camming sleeve allows said segmented collects to disengage said stud due to the difference in area between said second body extension surface and said second body retraction surface being smaller than the difference in area between said gripper means actuation surface and the said gripper means retraction surface.

12. An apparatus for tensioning a stud extending from a surface, comprising:

a body adapted to be removably mounted about the stud extending from the surface, said body including a first body member and a second body member;

said first body member having a surface engaging end and a chamber end, said surface engaging end for engaging the surface and said chamber end for receiving said second body member;

said second body member having a stud bore therethrough adapted to receive the stud therein:

gripper means surrounding said stud bore of said second body member for gripping the stud;

low pressure force means acting within said body for retaining said second body member in a contracted position where said second body member is contracted into said first body member when said apparatus is mounted on a stud and for moving said gripper means to a retracted position from said stud bore thereby facilitating mounting of said tensioner on said stud;

high pressure force means acting within said body for overpowering the effects of said low pressure force means and moving said gripper means and said second body member, said high pressure force means moving said gripper means from said retracted position to an engaging position in engagement with the stud, and said high pressure force means moving said second body member from a contracted position, wherein said gripper means is in said engaging position to an expanded position wherein said gripper means tensions the stud;

regulation means operably connected to said high and low pressure force means for automatically regulating radial movement of said gripper means into engagement with the stud prior to said second body member moving from said contracted position to said expanded position; and a nut tightening socket loosely engaged in said first body member, said socket having a demountable handle formed therewith that protrudes through an opening formed in said first body member to permit rotation of the nut on the stud.

13. A method for tensioning a stud extending from a surface, comprising the steps of:

forcing fluid under low pressure into a low pressure regulation passage of a first body member of a body thereby holding a second body member of said body retracted within a chamber of the first body member;

forcing a camming sleeve into a retracted position with said low pressure fluid forcing wherein said camming sleeve does not exert a force on collet members surrounding said stud bore;

maintaining initial maximum clearance in the stud bore in said second body member by tangentially forcing apart collet members surrounding said stud bore until said collet members are in contact with said retracted camming sleeve;

positioning a body including a first body member and a second body member, the first body member having a surface engaging end and a chamber end, the second body member formed having a stud bore therethrough and received with the chamber of the first body member, said second body member movable between a contracted position and an expanded position with respect to said first body member, the surface engaging end of the first body member adapted to engage the surface as a result of said positioning about the stud extending from the surface;

amplifying low fluid pressure to achieve a high fluid pressure for actuating the said gripper assembly for forcing said second body member from said contracted position to the said expanded position;

forcing fluid under high pressure into a high pressure regulation passage in the first body member for actuating a gripper assembly by first overcoming retraction forces caused by said low fluid pressure forcing;

moving collet members by use of a camming sleeve between a retracted position wherein the collet members are not in engagement with the stud and an engaging position wherein the collet members are in engagement with the stud;

gripping the stud with the gripper assembly within the stud bore of the second body member;

automatically regulating distribution of said high and low forcing fluid pressure such that the gripper assembly is forced to securely engage the stud before the second body member can be forced from the contracted position wherein the gripper assembly engages the stud to the expanded position wherein the gripper assembly tensions the stud; and moving the second body member automatically from the contracted position after the gripper assembly engages the stud, to an expanded position wherein the gripper assembly tensions the stud.

14. The method of claim 13, further including the step of:

actuating the camming sleeve with said high fluid pressure forcing.

15. A method for tensioning a stud extending from a surface, comprising the steps of:

forcing fluid under low pressure into a low pressure regulation passage of a first body member of a body thereby holding a second body member of said body retracted within a chamber of the first body member;

positioning a body including a first body member and a second body member, the first body member having a surface engaging end and a chamber end, the second body member formed having a stud bore therethrough and received with the chamber of the first body member, the surface engaging end of the first body member adapted to engage the surface as a result of said positioning about the stud extending from the surface;

forcing fluid under high pressure into a high pressure regulation passage in the first body member for actuating a gripper assembly by first overcoming retraction forces caused by said low fluid pressure forcing;

gripping the stud with the gripping assembly within the stud bore of the second body member;

automatically regulating distribution of said high and low forcing fluid pressure such that the gripper assembly is forced to securely engage the stud before the second body member can be forced from the contracted position wherein the gripper assembly engages the stud to the expanded position wherein the gripper assembly tensions the stud;

moving the second body member automatically from the contracted position after the gripper assembly engages the stud, to an expanded position wherein the gripper assembly tensions the stud; and releasing the body from the stud by a predetermined series of automatically occurring steps, including:
reducing said high fluid pressure forcing in said first body member which holds said second body member in the expanded position;
retaining low fluid pressure on said first body member;
initially moving the second body member towards the contracted position thereby relieving stress on the stud; and
disengaging said gripper assembly from the stud.

16. A method for tensioning a stud extending from a surface, comprising the steps of:
forcing fluid under low pressure into a low pressure regulation passage of a first body member of a body thereby holding a second body member of said body retracted within a chamber of the first body member;
positioning a body including a first body member and a second body member, the first body member having a surface engaging end and a chamber end, the second body member formed having a stud bore therethrough and received with the chamber of the first body member, said second body member movable between a contracted position and an expanded position relative to said first body member, the surface engaging end of the first body member adapted to engage the surface as a result of said positioning, about the stud extending from the surface;
amplifying low fluid pressure to achieve a high fluid pressure for actuating the said gripper assembly for forcing said second body member from said contracted position to the said expanded position;
forcing fluid under high pressure into a high pressure regulation passage in the first body member for actuating a gripper assembly by first overcoming retraction forces caused by said low fluid pressure forcing;
gripping the stud with the gripper assembly within the stud bore of the second body member;
automatically regulating distribution of said high and low forcing fluid pressure such that the gripper assembly is forced to securely engage the stud before the second body member can be forced from the contracted position wherein the gripper assembly engages the stud to the expanded position wherein the gripper assembly tensions the stud;

moving the second body member automatically from the contracted position after the gripper assembly engages the stud, to an expanded position wherein the gripper assembly tensions the stud;

releasing the body from the stud by a predetermined series of automatically occurring steps, comprising:
reducing said high fluid pressure forcing in said first body member which holds said second body member in the expanded position;
retaining low fluid pressure on said first body member;
initially moving the second body member towards the contracted position thereby relieving stress on the stud; and
disengaging said gripper assembly from the stud.

17. A method for tensioning a stud extending from a surface, comprising the steps of:
forcing fluid under low pressure into a low pressure regulation passage of a first body member of a body thereby holding a second body member of said body retracted within a chamber of the first body member;
positioning a body including a first body member and a second body member, the first body member having a surface engaging end and a chamber end, the second body member formed having a stud bore therethrough and received with the chamber of the first body member, the surface engaging end of the first body member adapted to engage the surface as a result of said positioning, about the stud extending from the surface;
forcing fluid under high pressure into a high pressure regulation passage in the first body member for actuating a gripper assembly by first overcoming retraction forces caused by said low fluid pressure forcing;
gripping the stud with the gripper assembly within the stud bore of the second body member;
automatically regulating distribution of said high and low forcing fluid pressure such that the gripper assembly is forced to securely engage the stud before the second body member can be formed from the contracted position wherein the gripper assembly engages the stud to the expanded position wherein the gripper assembly tensions the stud;
moving the second body member automatically from the contracted position after the gripper assembly engages the stud, to an expanded position wherein the gripper assembly tensions the stud; and
threading a nut on the stud after said moving to retain tension on the stud by manipulating a handle connected to a socket.

* * * * *

UNITED STATES PATENT AND TRADEMARK OFFICE
CERTIFICATE OF CORRECTION

PATENT NO. :   4,523,742

DATED   :   June 18, 1985

INVENTOR(S) :   Bobby J. Reneau

It is certified that error appears in the above-identified patent and that said Letters Patent is hereby corrected as shown below:

Column 2, line 8:
  Please delete "for a constracted" and insert therefor
  --from a contracted--.

Column 5, line 6:
  Please delete "wehrein" and insert therefor --wherein--.

Column 5, line 18:
  Please delete "C" and insert therefor --G--.

Column 6, line 11:
  Please delete "C" and insert therefor --G--.

Column 7, line 18:
  Please delete "forces" and insert therefor --force--.

Column 12, line 45:
  Please delete "controlled" and insert therefor --contracted--.

UNITED STATES PATENT AND TRADEMARK OFFICE
CERTIFICATE OF CORRECTION

PATENT NO. : 4,523,742

DATED : June 18, 1985

INVENTOR(S) : Bobby J. Reneau

It is certified that error appears in the above-identified patent and that said Letters Patent is hereby corrected as shown below:

Column 13, lines 44 and 45:
  Please delete "said low pressure fluid force acting on a gripper assembly".

Column 14, lines 3 and 4:
  Please delete "due to the pressure buildup in said high pressure regulation passage".

Column 15, line 2:
  Please delete "collects" and insert therefor--collect--.

Column 18, line 44:
  Please delete "formed" and insert therefor --forced--.

Signed and Sealed this

Twenty-second Day of October 1985

[SEAL]

Attest:

Attesting Officer

DONALD J. QUIGG

Commissioner of Patents and Trademarks—Designate